United States Patent
Jiang et al.

[11] Patent Number: 6,038,151
[45] Date of Patent: Mar. 14, 2000

[54] SWITCHING NETWORK AND METHOD OF REDUCING INPUT CURRENT TOTAL HARMONIC DISTORTION FOR A BOOST CONVERTER

[75] Inventors: Yimin Jiang; Hengchun Mao, both of Plano, Tex.

[73] Assignee: Lucent Technologies Inc., Murray Hill, N.J.

[21] Appl. No.: 09/118,110

[22] Filed: Jul. 17, 1998

[51] Int. Cl.[7] .................................................. H02M 7/04
[52] U.S. Cl. ............................................. 363/89; 363/44
[58] Field of Search ............................... 363/39, 44, 45, 363/46, 84, 89, 90, 125, 127

[56] References Cited

U.S. PATENT DOCUMENTS

| | | | |
|---|---|---|---|
| 5,138,544 | 8/1992 | Jessee | 363/43 |
| 5,506,766 | 4/1996 | Takahashi | 363/126 |
| 5,784,269 | 7/1998 | Jacobs et al. | 363/89 |
| 5,886,891 | 3/1999 | Jiang et al. | 363/84 |

OTHER PUBLICATIONS

Da Feng Weng, S. Yuvarajan, "Resonant Boost Input Three Phase Power Factor Corrector," Sep. 1998 IEEE, pp. 958–962.

*Primary Examiner*—Matthew Nguyen

[57] ABSTRACT

For use with a boost converter having first, second and third input inductors, a switching network, method of reducing input current total harmonic distortion (THD) associated with the boost converter, and boost converter employing the switching network and method. In one embodiment, the switching network includes first and second switches coupled between corresponding rails of the boost converter. The switching network also includes first, second and third L-C resonant networks wye-coupled to a node located between the first and second switches and coupled to the first, second and third input inductors, respectively. The first and second switches and the first, second and third L-C resonant networks cooperate to create resonant voltages across, and induce phase currents through, the first, second and third input inductors to reduce input current THD associated with the boost converter.

21 Claims, 3 Drawing Sheets

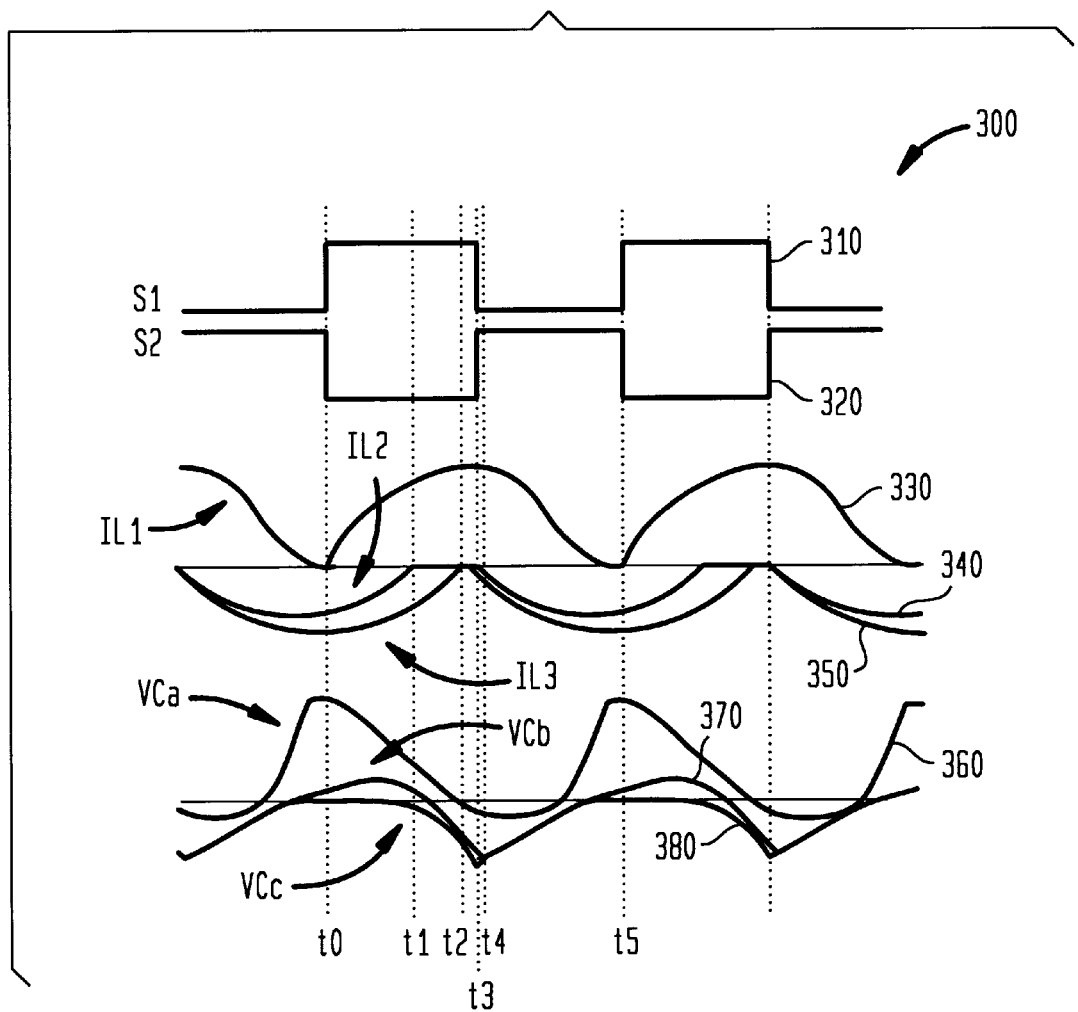

ize: 6,038,151

SWITCHING NETWORK AND METHOD OF REDUCING INPUT CURRENT TOTAL HARMONIC DISTORTION FOR A BOOST CONVERTER

TECHNICAL FIELD OF THE INVENTION

The present invention is directed, in general, to power conversion and, more specifically, to a switching network and method of reducing input current total harmonic distortion (THD) for a boost converter.

BACKGROUND OF THE INVENTION

Over the past ten years, increasing attention has been focused on input current total harmonic distortion (THD) due to the increasing use of nonlinear loads that tend to degrade AC line quality. THD standards, such as IEC-1000.3.2 promulgated by the International Electrotechnical Commission, address input currents of, for example, 16 amperes or less per phase. Although no international standards for high power rectification exist at the present time, some countries, e.g., India and Brazil, have imposed their own requirements on input current THD to protect their AC line quality.

For producing low THD input currents in three-phase rectification, there are three different conventional approaches. The first approach utilizes six controllable power switches to actively control the three input phase currents. Separate current control loops are used to pattern each of the three input phase current waveforms, resulting in lower THD input currents. This power factor correction (PFC) approach, however, requires complex and relatively expensive control and power conversion circuitry. For example, to implement the current control loops, multiple current sensors are required to detect the input currents. Either digital signal processors (DSPs) or multiple analog controllers are required to process the information. Furthermore, the power stage requires six separate switches with independent drivers, with at least three of the drivers "floating".

The second approach to producing low THD input currents is to employ three single-phase PFC "units" to form a three-phase unit. In single-phase PFC units, input currents are controlled by the duty cycle of a power switch to follow the input voltage emulating a resistive load, which in turn, reduces the THD in the input current. If a single-phase unit has already been developed, a three-phase unit can be readily implemented. A major limitation with this approach is the relatively high cost due to the replication of control and power circuitry required to construct the three-phase unit.

A single-switch boost converter operating in discontinuous conduction mode (DCM) with a high output voltage is the third approach to reducing THD in the input currents. In this boost converter, the decay time of a boost inductor current, over a switching cycle, is determined primarily by the difference between the output DC voltage and the input voltage during the switching cycle. The greater the difference, the faster the inductor currents are reduced to zero. Consequently, the input currents' THDs are also reduced. This approach is attractive for its simplicity, higher reliability and associated lower costs. A serious limitation, however, is that the required output voltage for achieving an acceptable THD value is typically very high. The required high output voltage (for achieving low THD input currents) complicates the selection of the power switching components and the design of the successive, or cascaded load, DC/DC converters, especially when the AC input voltages are as high as 440 volts rms.

Accordingly, what is needed in the art is an improved power converter that overcomes the above-described limitations. More specifically, what is needed in the art is a power converter that has the desirable features of the above-described converters, such as simple control, simple power stage, low output voltage and low input current THD without their limitations.

SUMMARY OF THE INVENTION

To address the above-described deficiencies of the prior art, the present invention provides for use with a boost converter having first, second and third input inductors, a switching network, method of reducing input current total harmonic distortion (THD) associated with the boost converter, and boost converter employing the switching network and method.

In one embodiment, the switching network includes first and second switches coupled between corresponding rails of the boost converter. The switching network also includes first, second and third L-C resonant networks wye-coupled to a node located between the first and second switches and coupled to the first, second and third input inductors, respectively. The first and second switches and the first, second and third L-C resonant networks cooperate to create resonant voltages across, and induce phase currents through, the first, second and third input inductors to reduce input current THD associated with the boost converter.

The present invention therefore introduces a switching network for a boost converter that creates resonant voltages across, and induces phase currents through, the first, second and third input inductors to reduce input current THD associated with the boost converter. The operation of the first and second switches of the switching network facilitate the resonance between the inductors and capacitors of the L-C resonant networks. As a result, resonant voltages are applied across the respective input inductors and, ultimately, the input current THD is reduced in all three phases of the boost converter.

In one embodiment of the present invention, the boost converter further includes a rectifier interposed between the first, second and third input inductors and the switching network. The rectifier may be a passive or active network. In an alternative embodiment, the boost converter is coupled to a regulation circuit that controls the first and second switches. The regulation circuit may include a pulse-width modulation (PWM) circuit. Those skilled in the art are familiar with rectifier and regulation circuits.

In one embodiment of the present invention, the first and second switches each conduct for a duty cycle of about 50%. The duty cycle relates to the conduction period of the respective switches. In the present embodiment, the switches are controlled complementarily, with the first switch turned on for about 50% of a switching cycle and the second switch turned on during at least a substantial portion of the remaining switching cycle. The broad scope of the present invention, however, is not limited to a particular conduction interval for the switches.

In one embodiment of the present invention, the boost converter further includes an output capacitor coupled across an output of the boost converter. The output capacitor filters a DC waveform at the converter output. Those skilled in the art are familiar with such filters.

In one embodiment of the present invention, the switching network further includes a plurality of diodes interposed between first, second and third inductors of the first, second and third L-C resonant networks, respectively, and the first and second switches. In a related, but alternative embodiment, the switching network further includes first and second blocking diodes coupled between the first and second switches, respectively, and the corresponding rails. In an embodiment to be illustrated and described, the switching network includes the plurality of diodes and the blocking diodes.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which:

FIG. 3 illustrates exemplary drive signals, current and voltage waveforms of the converter illustrated in FIG. 2.

DETAILED DESCRIPTION

Figure 1:
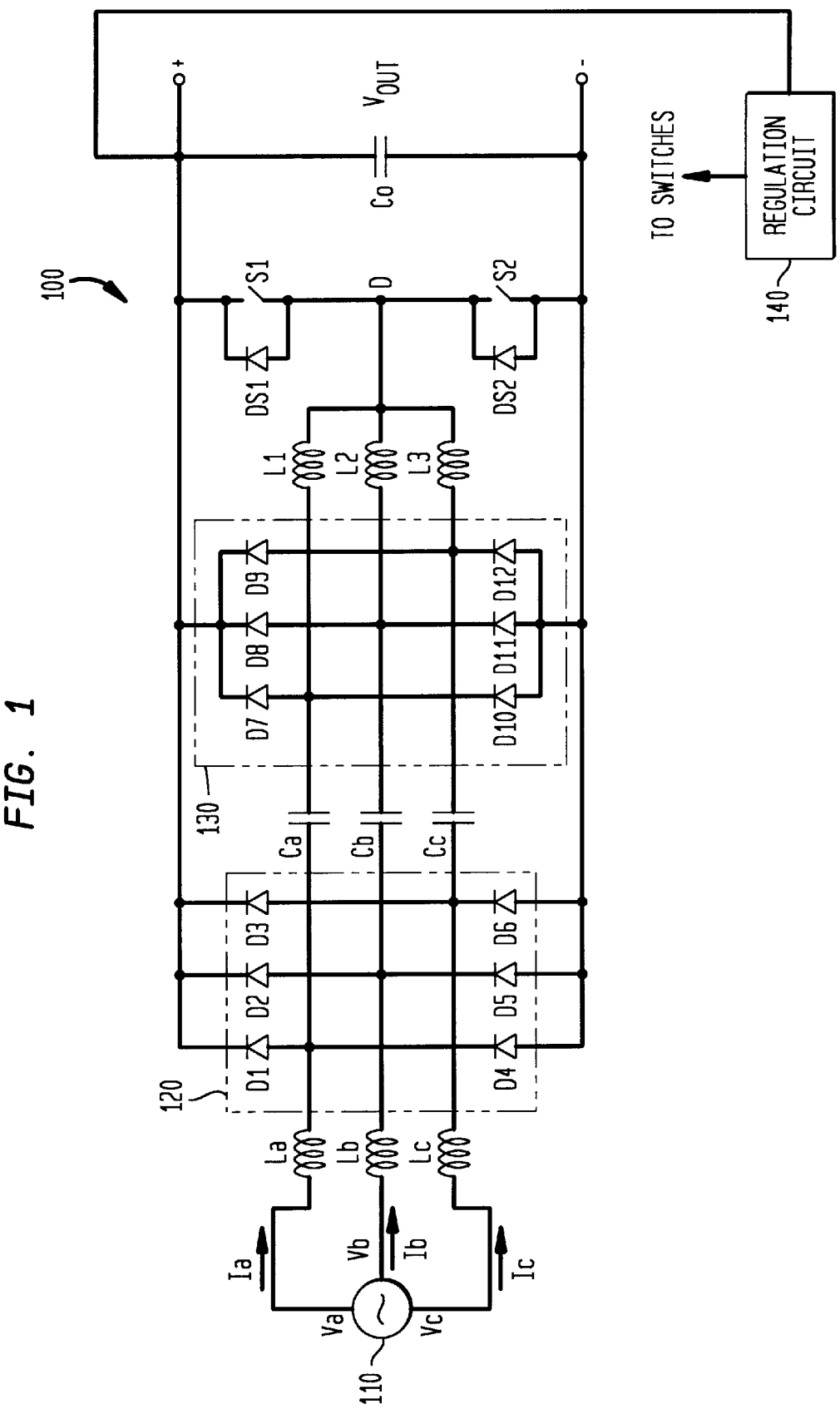
FIG. 1 illustrates a schematic diagram of an exemplary two-switch three-phase boost converter with three L-C resonant branches.

Referring initially to FIG. 1, illustrated is a schematic diagram of an exemplary two-switch three-phase boost converter 100 with three L-C resonant branches. The two-switch three-phase boost converter 100 receives input power from a three-phase AC voltage source 110 through first, second and third boost inductors La, Lb, Lc that are coupled to a three-phase rectifier 120. The three-phase rectifier 120 includes a plurality of diodes D1-D6 arranged in a full bridge configuration.

Also shown coupled to the first, second and third boost inductors La, Lb, Lc are three resonant branches (not separately referenced), each including a resonant capacitor and a resonant inductor. Specifically, the first boost inductor La is coupled to a first resonant capacitor Ca and a first resonant inductor L1, the second boost inductor Lb is coupled to a second resonant capacitor Cb and a second resonant inductor L2, and the third boost inductor Lc is coupled to a third resonant capacitor Cc and a third resonant inductor L3. A freewheeling circuit 130 that includes a plurality of diodes D7–D12 is also coupled to the three resonant branches. A common terminal of the first, second and third resonant inductors L1, L2, L3 is coupled to a node D between the first and second boost switches S1, S2. A regulation circuit 140 senses an output voltage Vout and provides gate drive signals to the first and second boost switches S1, S2. An output capacitor Co is also shown coupled across the first and second boost switches S1, S2 to filter the output DC waveform.

As the operation of the converter 100 over a switching cycle is described in greater detail below, the following assumptions and conditions apply (of course, the assumptions and conditions are not necessary to the operation of the boost converter 100).

(1) The capacitors Ca, Cb and Cc are relatively high frequency capacitors, i.e., the average current through each capacitor over a switching cycle is small enough compared with the high frequency operating current for its voltage to stay in its designed operating region. In other words, the low frequency components of their currents are relatively small.

(2) All the inductors are relatively high frequency inductors, i.e., the average volts-second applied on each inductor over a switching cycle is close to zero. In other words, the inductors do not carry low frequency voltages.

(3) Phase voltage (Va) and phase current (Ia) coupled to the first boost inductor La are greater than 0, or positive; phase voltages (Vb and Vc) and currents (Ib and Ic) coupled to the second and third boost inductors Lb, Lc are negative.

(4) The currents in the first, second and third boost inductors La, Lb, Lc are continuous.

(5) The first and second switches S1, S2 are operated complementarily with duty cycles of about 50%.

It should be noted that the following operational modes are for illustrative purposes and that the operational modes may vary with different operating conditions. Also, for the purposes of the following description and referring to FIG. 1, positive inductor current is defined as moving from left to right and capacitor voltage is defined as positive on its left terminal.

At the end of the second boost switch S2 conduction, i.e., ON, period, the first resonant capacitor Ca is charged by the input current Ia to a positive value while the second and third resonant capacitors Cb, Cc are fully discharged from negative voltages. Also, at this time, the current in the first resonant inductor L1 is positive and is equal to the current in the first boost inductor La. The current in the second resonant inductor L2 is also positive and its amplitude is determined by the resonance between the second resonant capacitor Cb and inductor L2 that occurs when the second boost switch S2 was turned ON. The current in the third resonant inductor L3 is also positive and its amplitude is determined by the resonance between the third resonant capacitor Cc and inductor L3 that occurs when the second boost switch S2 was turned ON. It should be noted that all the resonant inductors carry positive currents at this time.

MODE 1: At the beginning of this first mode, the second boost switch S2 is turned OFF and the first boost switch S1 is turned ON. Once the second boost switch S2 is OFF, the three positive resonant inductor currents force the node D to move to the top rail and the diode Ds1 conducts, allowing the first boost switch S1 to be turned ON at zero voltage. If the switches' duty-cycles are not close to 50%, however, this soft-switching condition may be lost. With the first boost switch S1 ON, the positive voltage on the first resonant capacitor Ca is applied on the first resonant inductor L1 through diode D1, driving the current in the first resonant inductor L1 from a positive value down in a resonant fashion. During this first mode, the second and third resonant inductors L2, L3 first encounter the full output voltage Vout through the first boost switch S1 and the diodes D11, D12. The second and third resonant inductors' L2, L3 currents also decrease from their positive values back to zero. During this mode, the voltages on the second and third resonant capacitors Cb, Cc remain at zero.

MODE 2: In the second mode, the resonance between the first resonant capacitor Ca and inductor L1 continues and the current in the first resonant inductor L1 continues to decrease. The currents in the second and third resonant inductors L2, L3 change to negative and begin to charge the second and third resonant capacitors Cb, Cc to negative voltages. The voltages applied on the second and third resonant inductors L2, L3 are the differences between the output voltage Vout and the voltages on the second and third resonant capacitors Cb, Cc, respectively. The currents in the second and third resonant inductors L2, L3 then increase in the negative direction. This increase is almost linear, because the voltages on the second and third resonant capacitors Cb, Cc remain small compared to the output voltage Vout.

MODE 3: In the third more, once the currents in the second and third resonant inductors L2, L3 "catch up" with the phase currents Ib and Ic, their changing rate is greatly reduced, since they are in series with the substantially larger second and third boost inductors Lb, Lc. Also during this mode, the input phase currents Ib, Ic charge their respective second and third resonant capacitors Cb, Cc to negative voltages. Concurrently, the resonance between the first resonant capacitor Ca and inductor L1 continues with the current in the first resonant inductor L1 becoming negative. The voltage on the first resonant capacitor Ca also decreases with this resonance and may reach zero if the switch ON time is longer than ¼ of the resonant period. If the voltage on the first resonant capacitor Ca reaches zero, the current in the first resonant inductor L1 freewheels through the diode D7 and the voltage on the first resonant capacitor Ca remains at zero, since both the diodes D1, D7 are conducting. At the end of this third mode, all three currents in the first, second and third resonant inductors L1, L2, L3 are negative and conduct through the first boost switch S1. Also, the voltage on the first resonant capacitor Ca is zero if fully discharged. The voltages on the second and third resonant capacitors Cb, Cc are negative, with their amplitudes determined by their corresponding phase currents.

MODE 4: In the fourth mode, the first boost switch S1 turns OFF and the second boost switch S2 turns ON. Once the first boost switch S1 is OFF, the three negative resonant inductor currents force the node D to move to the bottom rail through diode Ds2 and allow the second boost switch S2 to be turned on at zero voltage. The first resonant inductor L1 encounters the full output voltage Vout as its negative current goes through the diodes D7, Ds2. This current decreases in amplitude under the full output voltage Vout and then reverses its direction and the first resonant inductor L1 forms a series circuit with the first resonant capacitor Ca when the diode D7 stops conducting. The first resonant inductor L1 now encounters the output voltage Vout less the voltage on the first resonant capacitor Ca, and its current ramps up. Once it reaches the input phase current Ia, the diode D1 stops conducting and the full input phase current Ia flows into the first resonant capacitor Ca. Additionally, the second and third resonant capacitors Cb, Cc resonate with the second and third resonant inductors L2, L3, respectively. The currents in the second and third resonant inductors L2, L3 also increase from their negative values to positive values. If the second and third resonant capacitors Cb, Cc are fully discharged, the currents in the second and third resonant inductors L2, L3 freewheels through the diodes D11 and D12. This reaches the condition in which the above-described mode 1 is entered.

Figure 2:
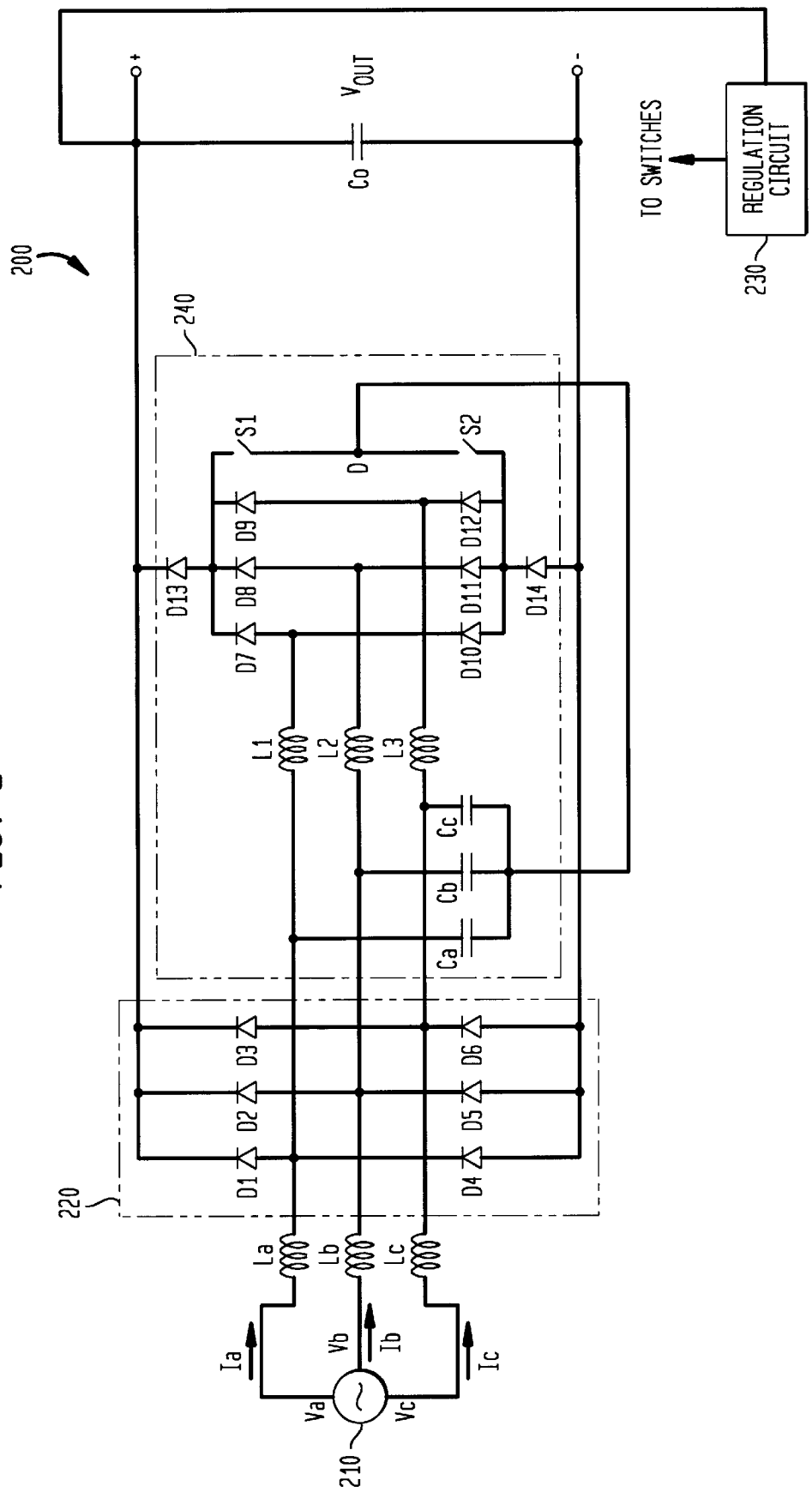
FIG. 2 illustrates a schematic diagram of an embodiment of a boost converter with wye (Y) connected resonant capacitors constructed according to the principles of the present invention.

Turning now to FIG. 2, illustrated is a schematic diagram of an embodiment of a boost converter 200 with wye (Y) connected resonant capacitors constructed according to the principles of the present invention. The converter 200 includes first, second and third boost inductors La, Lb, Lc that are coupled to an AC input power source 210. A rectifier 220 that includes a plurality of diodes D1–D6 arranged in a full bridge configuration is also coupled to the boost inductors. Those skilled in the art should readily appreciate that, in other advantageous embodiments, controllable switches may be used in place of the diodes in the rectifier 220. The rectifier 220 provides partial paths for the three input phase currents to flow to the output. Also shown in the illustrated embodiment are first and second boost switches S1, S2 that, in an advantageous embodiment, are metal oxide semiconductor field-effect transistors (MOSFETs). In another advantageous embodiment, other switching devices, such as insulated gate bipolar transistors (IGBTs), may also be advantageously employed. The first and second boost switches S1, S2, in an advantageous embodiment, are operated complementarily with duty cycles of about 50%. It should be noted that the duty cycles of the first and second boost switches S1, S2 may be varied and may be used to control the input power level. In another advantageous embodiment, the switching frequency of the boost switches S1, S2 may be used to control the input power.

The first, second and third boost inductors La, Lb, Lc are also shown coupled to a switching network 240 that includes first, second and third resonant capacitors Ca, Cb, Cc wye (Y) connected with the first, second and third resonant inductors L1, L2, L3, respectively, and to a node D between the first and second boost switches S1, S2. Also included in the switching network 240 are a plurality of diodes D7–D14 that include blocking diodes D13, D14. The diodes D7–D14 together with the first and second boost switches S1, S2 provide a path for resonant currents to flow.

A regulation circuit 230 senses an output voltage Vout and provides gate drive signals to the first and second boost switches S1, S2. In an advantageous embodiment, the regulation circuit includes a PWM controller. Those skilled in the art are familiar with the construction and operation of PWM controllers; thus, they will not hereinafter be described in detail. An output capacitor Co is also shown coupled across the rectifier 220 to filter the output DC waveform. The operation of the converter 200 is best described by referring to FIG. 3, with continuing reference to FIG. 2.

Turning now to FIG. 3, illustrated are exemplary drive signals, current and voltage waveforms 300 of the converter 200 illustrated in FIG. 2. The waveforms 300 include first and second drive signals 310, 320 of the first and second boost switches S1, S2, respectively and first, second and third current waveforms 330, 340, 350 corresponding to inductor currents in the first, second and third resonant inductors L1, L2, L3, respectively. Also illustrated are first, second and third voltage waveforms 360, 370, 380 corresponding to voltages across the first, second and third resonant capacitors Ca, Cb, Cc, respectively.

The following assumptions and initial conditions apply in describing the operation of the converter 200 in greater detail over an exemplary switching cycle (of course, the assumptions and conditions are not necessary to the operation of the converter 200).

(1) All the capacitors except the output capacitor Co are relatively high frequency capacitors, i.e., the average current through each capacitor over a switching cycle is sufficiently small compared to the high frequency operating current such that its voltage stays in its designed operating region. In other words, the low frequency components of their currents are relatively small.

(2) All the inductors are relatively high frequency inductors, i.e., the average volt-second applied on each boost inductor over a switching cycle is close to zero. In other words, the boost inductors do not carry low frequency voltages.

(3) Phase voltage (Va) and phase current (Ia) coupled to the first boost inductor La are greater than 0, or positive; phase voltages (Vb and Vc) and currents (Ib and Ic) coupled to the second and third boost inductors Lb, Lc are negative.

(4) All phase currents (Ia, Ib and Ic) are in continuous conduction mode (CCM).

(5) The first and second boost switches S1, S2 are operated complementarily with duty cycles of about 50%.

It should be noted that the following operational modes are for illustrative purposes and that the operational modes may vary with different operating conditions. Also, for the purposes of the following description and referring to FIG. 2, positive inductor current is defined as moving from left to right and capacitor voltage is defined as positive on its top, or upper, terminal.

At the end of the second boost switch S2 conduction period, the current in the first resonant inductor L1, i.e., represented by a first current waveform 330, is zero (inductor L1 is fully discharged) and the voltage across the first resonant capacitor Ca, represented by a first voltage waveform 360, is at a high value (possibly clamped to the positive output voltage Vout). The currents in the second and third resonant inductors L2, L3, represented by second and third current waveforms 340, 350, respectively, are negative (the negative voltages on the second and third resonant capacitors Cb, Cc are applied on the second and third resonant inductors L2, L3 before this time). The voltages on the second and third resonant capacitors Cb, Cc, represented by second and third voltage waveforms 370, 380, respectively, are relatively small, since their energy has been discharged into the second and third resonant inductors L2, L3.

The exemplary operation of the converter 200 begins, at time t0, with the second boost switch S2 being turned OFF. Immediately following the turning OFF of the second boost switch S2, depending upon the switching scheme employed, the first boost switch S1 is turned ON. The first resonant capacitor Ca voltage is immediately applied on the first resonant inductor L1 and the resonance begins with the initial zero current in the first resonant inductor L1. Subsequently, the current in the first resonant inductor L1 increases in a resonance fashion and the voltage across the first resonant capacitor Ca decreases accordingly. With the second boost switch S2 OFF, the currents in the second and third resonant inductors L2, L3 follow the current paths through diodes D11, D12, D14. Consequently, the second and third resonant inductors L2, L3 encounter the output voltage Vout, minus the voltage across the first resonant capacitor Ca in series with the voltages across the second and third resonant capacitors Cb, Cc, causing the negative currents in the second and third resonant inductors L2, L3 to decrease in amplitude. During this period, the second and third resonant capacitors Cb, Cc are charged in the positive direction. Once the current in the second resonant inductor L2 is lower in amplitude than the current in the second boost inductor Lb, the current in the second resonant capacitor Cb changes direction and begins to be charge the second resonant capacitor Cb towards the negative polarity. The same conditions are also true for the third resonant inductor and capacitor L3, Cc. It should be noted that, during this mode (first boost switch S1 ON), the currents in the second and third resonant inductors L2, L3 reach zero. Before the first boost switch S1 turns OFF, the voltage across the first resonant Ca is relatively low (its energy has been transferred into the first resonant inductor L1). Also prior to the turn-off of the first boost switch S1, the voltages across the second and third resonant inductors Cb, Cc are charged to almost their negative peak values.

At time t3, the first boost switch S1 is turned OFF and the second boost switch S2 is turned ON. Once the first boost switch S1 is OFF, the current in the first resonant inductor L1 conducts through the diodes D7, D13 and is discharged to the output. The voltage across the first resonant capacitor Ca is charged to a relatively high positive value by the input current in the first boost inductor La. At the same time, the voltages across the second and third resonant capacitors Cb, Cc are immediately applied to the second and third resonant inductors L2, L3, respectively, which in turn, drive their currents towards negative from zero. Subsequently, the voltages across the second and third resonant capacitors Cb, Cc are discharged to a smaller value in amplitude. This reaches the initial conditions at time t0 described above and completes a switching cycle.

It should be emphasized that the above described operation of the converter 200 over an exemplary switching cycle is one example under a particular set of operating conditions. It should be noted that, for different operating conditions, the results may be different due to the complex resonant processes involved. The first, second and third resonant inductors L1, L2, L3 currents in the converter 200, unlike the converter 100 resonant inductors' currents, are not required to increase to a much larger value than the continuous input phase currents Ia, Ib, Ic, because the resonance between the resonant capacitors and the resonance inductors does not rely on the current levels in the boost inductors. As a result, the boost switches S1, S2 conduct less currents than the converter 100 boost switches. The lower current handling requirement for the converter 200 boost switches provides significant advantages in terms of cost and design when selecting power switching devices for the boost switches S1, S2.

While specific embodiments of a power converter and a method for reducing a input current THD have been illustrated and described, other embodiments are well within the broad scope of the present invention. For a better understanding of switching power converters, in general, see "Principles of Power Electronics" by John G. Kassakian, et al., Addison Wesley, Inc. (1991), which is incorporated herein by reference.

Although the present invention and its advantages have been described in detail, those skilled in the art should understand that they can make various changes, substitutions and alterations herein without departing from the spirit and scope of the invention in its broadest form.

What is claimed is:

1. For use with a boost converter having first, second and third input inductors, a switching network, comprising:
   first and second switches coupled between corresponding rails of said boost converter; and
   first, second and third L-C resonant networks wye-coupled to a node located between said first and second switches and coupled to said first, second and third input inductors, respectively, said first and second switches and said first, second and third L-C resonant networks cooperating to create resonant voltages across, and induce phase currents through, said first, second and third input inductors to reduce input current total harmonic distortion (THD) associated with said boost converter.

2. The switching network as recited in claim 1 further comprising a rectifier interposed between said first, second and third input inductors and said switching network.

3. The switching network as recited in claim 1 wherein said first and second switches each conduct for a duty cycle of about 50%.

4. The switching network as recited in claim 1 further comprising an output capacitor coupled across an output of said boost converter.

5. The switching network as recited in claim 1 further comprising a plurality of diodes interposed between first, second and third inductors of said first, second and third L-C resonant networks, respectively, and said first and second switches.

6. The switching network as recited in claim 1 further comprising first and second blocking diodes coupled between said first and second switches, respectively, and said corresponding rails.

7. The switching network as recited in claim 1 wherein said boost converter is coupled to a regulation circuit that controls said first and second switches.

8. For use with a boost converter having first, second and third input inductors, a method of reducing input current total harmonic distortion (THD) associated with said boost converter, comprising:
   coupling first and second switches between corresponding rails of said boost converter;
   coupling first, second and third inductors, respectively, of first, second and third L-C resonant networks to said first, second and third input inductors, respectively;
   wye-coupling first, second and third capacitors, respectively, of first, second and third L-C resonant networks and to a node located between said first and second switches; and
   controlling said first and second switches to induce said first, second and third L-C resonant networks to create resonant voltages across, and induce phase currents through, said first, second and third input inductors to reduce input current THD associated with said boost converter.

9. The method as recited in claim 9 further comprising interposing a rectifier between said first, second and third input inductors and said switching network.

10. The method as recited in claim 9 further comprising inducing said first and second switches to conduct for a duty cycle of about 50%.

11. The method as recited in claim 9 further comprising filtering an output voltage of said boost converter.

12. The method as recited in claim 9 further comprising interposing a plurality of diodes between said first, second and third inductors and said first and second switches.

13. The method as recited in claim 9 further comprising coupling first and second blocking diodes between said first and second switches, respectively, and said corresponding rails.

14. The method as recited in claim 9 wherein the act of controlling is performed by a regulation circuit.

15. A low input current total harmonic distortion (THD) boost converter, comprising:
   first, second and third input inductors; and
   a switching network, comprising:
      first and second switches coupled between corresponding rails of said boost converter; and
      first, second and third L-C resonant networks wye-coupled to a node located between said first and second switches and coupled to said first, second and third input inductors, respectively, said first and second switches and said first, second and third L-C resonant networks cooperating to create resonant voltages across, and induce phase currents through, said first, second and third input inductors to reduce input current total harmonic distortion (THD) associated with said boost converter.

16. The boost converter as recited in claim 15 further comprising a rectifier interposed between said first, second and third input inductors and said switching network.

17. The boost converter as recited in claim 15 wherein said first and second switches each conduct for a duty cycle of about 50%.

18. The boost converter as recited in claim 15 further comprising an output capacitor coupled across an output of said boost converter.

19. The boost converter as recited in claim 15 wherein said switching network further comprises a plurality of diodes interposed between first, second and third inductors of said first, second and third L-C resonant networks, respectively, and said first and second switches.

20. The boost converter as recited in claim 15 wherein said switching network further comprises first and second blocking diodes coupled between said first and second switches, respectively, and said corresponding rails.

21. The boost converter as recited in claim 15 further comprising a regulation circuit that controls said first and second switches.

* * * * *